(12) United States Patent
Kawaguchi

(10) Patent No.: US 10,003,700 B2
(45) Date of Patent: Jun. 19, 2018

(54) ABNORMALITY MANAGEMENT SYSTEM OF IMAGE FORMING APPARATUS

(71) Applicant: KYOCERA Document Solutions Inc., Osaka-shi, Osaka (JP)

(72) Inventor: Tomoya Kawaguchi, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days. days.

(21) Appl. No.: 15/204,380

(22) Filed: Jul. 7, 2016

(65) Prior Publication Data

US 2017/0013142 A1 Jan. 12, 2017

(30) Foreign Application Priority Data

Jul. 9, 2015 (JP) .................................. 2015-138181

(51) Int. Cl.
*H04N 1/00* (2006.01)

(52) U.S. Cl.
CPC ..... *H04N 1/00084* (2013.01); *H04N 1/00037* (2013.01); *H04N 1/00074* (2013.01); *H04N 1/00344* (2013.01); *H04N 2201/0094* (2013.01)

(58) Field of Classification Search
CPC ........... H04N 1/00084; H04N 1/00037; H04N 1/00074; H04N 1/00344; H04N 2201/0094
See application file for complete search history.

(56) References Cited

U.S. PATENT DOCUMENTS

| | | | | |
|---|---|---|---|---|
| 2006/0168475 | A1* | 7/2006 | Segers | G06F 11/0733 714/25 |
| 2011/0299109 | A1 | 12/2011 | Kamisuwa et al. | |
| 2015/0180894 | A1* | 6/2015 | Sadovsky | G06F 3/0481 726/22 |

FOREIGN PATENT DOCUMENTS

| | | |
|---|---|---|
| CN | 102291508 A | 12/2011 |
| JP | 2006092183 A | 4/2006 |
| JP | 2008211662 A | 9/2008 |
| JP | 2011053775 A | 3/2011 |

\* cited by examiner

*Primary Examiner* — Iriana Cruz
(74) *Attorney, Agent, or Firm* — Alleman Hall Creasman & Tuttle LLP

(57) ABSTRACT

An image forming apparatus is communicable with a management apparatus and includes an abnormality detecting portion, a registered information obtaining portion, a registered-restoration processing portion, a specification receiving portion, a specified-restoration processing portion, and a registration requesting portion. The registered-restoration processing portion executes a registered restoration process in accordance with registered restoration procedure information obtained from the management apparatus. The specification receiving portion receives a specification input when the registered restoration procedure information was not obtained, or when an apparatus abnormality was not solved. The specified-restoration processing portion executes a specified restoration process in accordance with the specification input. The registration requesting portion requests the management apparatus to register information of the apparatus abnormality solved by the specified restoration process and of a specified restoration procedure.

4 Claims, 6 Drawing Sheets

| Error Code | Model | Restoration Procedure | Date | Times |
|---|---|---|---|---|
| E0001 | PRNxxx01 | Step A ,Step B, ... | 2015/05/01 | 11 |
| E0001 | PRNxxx02 | Step X ,Step Y, ... | 2015/05/12 | 3 |
| E0002 | PRNxxx01 | Step P ,Step Q, ... | 2015/03/23 | 6 |
| E0003 | PRNxxx05 | Step V ,Step W, ... | 2015/06/05 | 21 |

D5

D01  D05  D02  D07  D08

| Error Code | Restoration Procedure | Date | Times |
|---|---|---|---|
| E0001 | Step A ,Step B, ... | 2015/06/03 | 2 |
| E0001 | Step X ,Step Y, ... | 2015/02/13 | 1 |
| E0002 | Step P ,Step Q, ... | 2015/03/24 | 1 |
| E0003 | Step R ,Step S, ... | 2015/06/05 | 1 |

D1
D01　D02　D03　D04

| Command | Error Code | Model |
|---|---|---|
| Request | E0003 | PRNxxx05 |

D2
D20　D01　D05

| Priority | Restoration Procedure |
|---|---|
| 1 | Step R ,Step S, ... |
| 2 | Step H ,Step I, ... |

| Command | Error Code | Model | Restoration Procedure |
|---|---|---|---|
| Register | E0003 | PRNxxx05 | Step V ,Step W, ... |

| Error Code | Model | Restoration Procedure | Date | Times |
|---|---|---|---|---|
| E0001 | PRNxxx01 | Step A ,Step B, ... | 2015/05/01 | 11 |
| E0001 | PRNxxx02 | Step X ,Step Y, ... | 2015/05/12 | 3 |
| E0002 | PRNxxx01 | Step P ,Step Q, ... | 2015/03/23 | 6 |
| E0003 | PRNxxx05 | Step V ,Step W, ... | 2015/06/05 | 21 |

| Command | Error Code | Model | Device ID |
|---|---|---|---|
| Report | E0003 | PRNxxx05 | 1234567891 |

D60, D01, D05, D06 — D6

ABNORMALITY MANAGEMENT SYSTEM OF IMAGE FORMING APPARATUS

INCORPORATION BY REFERENCE

This application is based upon and claims the benefit of priority from the corresponding Japanese Patent Application No. 2015-138181 filed on Jul. 9, 2015, the entire contents of which are incorporated herein by reference.

BACKGROUND

The present disclosure relates to an image forming apparatus and an abnormality management system of an image forming apparatus.

In general, it is known that an image forming apparatus has a function to detect an apparatus abnormality of the apparatus itself. In addition, it is known that, when having detected a data damage of a system start program, the image forming apparatus receives a restoration start program from a management apparatus, and automatically installs the restoration start program in a storage area of the damaged data.

SUMMARY

An image forming apparatus according to an aspect of the present disclosure is communicable with a management apparatus and includes an abnormality detecting portion, a registered information obtaining portion, a registered-restoration processing portion, a specification receiving portion, a specified-restoration processing portion, and a registration requesting portion. The abnormality detecting portion is configured to detect an apparatus abnormality of its associated apparatus. The registered information obtaining portion is configured to request the management apparatus to send registered restoration procedure information, and obtain the registered restoration procedure information returned from the management apparatus. The registered restoration procedure information indicates a restoration procedure for solving the apparatus abnormality detected by the abnormality detecting portion. The registered-restoration processing portion is configured to execute a registered restoration process in accordance with the registered restoration procedure information obtained from the management apparatus. The specification receiving portion is configured to receive a specification input that specifies a restoration procedure for the detected apparatus abnormality, when the registered restoration procedure information was not obtained from the management apparatus, or when the apparatus abnormality was not solved by the registered restoration process. The specified-restoration processing portion is configured to execute a specified restoration process in accordance with the specification input. The registration requesting portion is configured to, when the apparatus abnormality was solved by the specified restoration process, request the management apparatus to register information of the solved apparatus abnormality and of the specified restoration procedure.

An abnormality management system of an image forming apparatus according to another aspect of the present disclosure includes the image forming apparatus according to the aspect of the present disclosure, and the management apparatus communicable with the image forming apparatus. The management apparatus includes a restoration procedure registering portion and a registered information returning portion. The restoration procedure registering portion is configured to, upon receiving a registration request from the image forming apparatus, store the registered restoration procedure information in a storage portion. The registration request includes the information of the apparatus abnormality and of the restoration procedure for solving the apparatus abnormality. The registered restoration procedure information includes the information, included in the registration request, of the apparatus abnormality and of the restoration procedure for solving the apparatus abnormality. Upon receiving, from the image forming apparatus, a request for the registered restoration procedure information, the registered information returning portion returns the requested registered restoration procedure information to the image forming apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a configuration diagram of restoration procedure registration request data that is transmitted by the image forming apparatus.

FIG. 10 is a configuration diagram of restoration procedure registration data in the management apparatus.

FIG. 11 is a configuration diagram of detected abnormality notification data that is transmitted by the image forming apparatus.

DETAILED DESCRIPTION

The following describes an embodiment of the present disclosure with reference to the attached drawings. It should be noted that the following embodiment is an example of a specific embodiment of the present disclosure and should not limit the technical scope of the present disclosure.

[Configuration of Abnormality Management System 100 of Image Forming Apparatus]

First, a configuration of an abnormality management system 100 of an image forming apparatus 10 according to an embodiment of the present disclosure is described with reference to FIG. 1.

Figure 1:
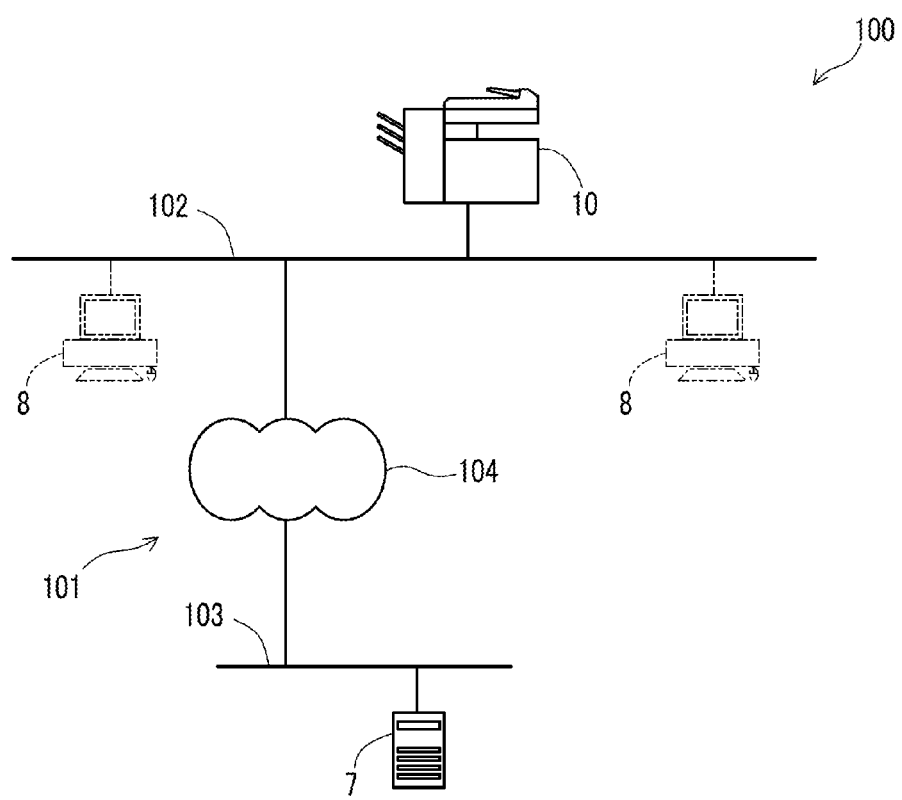
FIG. 1 is a configuration diagram of an abnormality management system of an image forming apparatus according to an embodiment.

As shown in FIG. 1, the abnormality management system 100 includes the image forming apparatus 10 and a management server 7 that can communicate each other. The management server 7 is an example of the management apparatus that is configured to transmit and receive information of restoration procedures from abnormalities, to/from a plurality of image forming apparatuses 10.

The image forming apparatus 10 is configured to communicate the management server 7 via a communication line 101. As one example, the communication line 101 may include a first LAN (Local Area Network) 102, a second LAN 103, and an internet 104, wherein the image forming apparatus 10 is a node of the first LAN 102, the management server 7 is a node of the second LAN 103, and the internet 104 connects the first LAN 102 and the second LAN 103.

A terminal apparatus 8 that transmits a print job to the image forming apparatus 10 is one of the nodes of the first LAN 102. In FIG. 1, the terminal apparatus 8 is indicated by an imaginary line (two-dot chain line). The management server 7 may be provided in the first LAN 102.

[Image Forming Apparatus 10]

Next, a configuration of the image forming apparatus 10 is described with reference to FIG. 2. The image forming apparatus 10 receives a print job that is an image forming job, from the terminal apparatus 8 and executes the print job. During the execution of the print job, the image forming apparatus 10 forms an image of the print job on a sheet member 901. The sheet member 901 is a sheet-like image formation medium such as a sheet of paper, a sheet of coated paper, a postcard, an envelope, or an OHP sheet.

Figure 2:
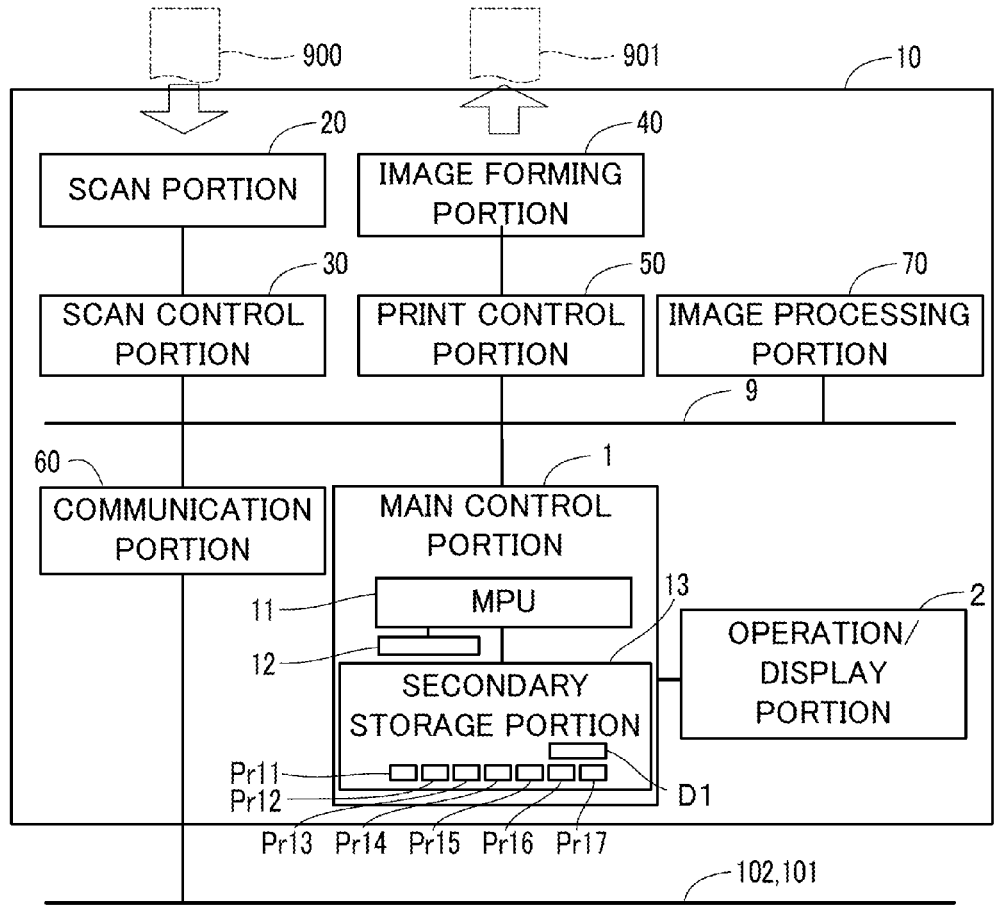
FIG. 2 is a block diagram of the image forming apparatus according to an embodiment.

The image forming apparatus 10 shown in FIG. 2 is a multifunction peripheral having a function of an image reading device for reading an image from a document sheet 900, and a function of an image forming device for forming an image on a sheet member 901. It is noted that the image forming apparatus 10 may be a facsimile apparatus having an image transmission function. In FIG. 2, the document sheet 900 and the sheet member 901 are indicated by an imaginary line.

The image forming apparatus 10 includes a main control portion 1, an operation/display portion 2, a scan portion 20, a scan control portion 30, an image forming portion 40, a print control portion 50, a communication portion 60, and an image processing portion 70.

The main control portion 1, the scan control portion 30, the print control portion 50, the communication portion 60, and the image processing portion 70 are connected to a bus 9, and can transmit and receive data to/from each other via the bus 9.

The scan portion 20 includes an optical system (not shown) for scanning the document sheet 900 with light, and an image sensor (not shown) for detecting an amount of light reflected from the document sheet 900 for each pixel, and outputting document sheet image data.

The scan control portion 30 obtains the document sheet image data by controlling the scan portion 20. Furthermore, the scan control portion 30 transports the document sheet image data to other portions, such as the image processing portion 70, via the bus 9.

The image forming portion 40 forms an image on a sheet member 901 by performing a well-known electrophotographic image forming process. The image forming portion 40, including an image carrying member (not illustrated) and its peripheral devices, transfers an image of developer from the image carrying member to the sheet member 901, and fixes the image to the sheet member 901.

The print control portion 50 causes the image forming portion 40 to execute a process of obtaining recording image data from the image processing portion 70 and forming an image on the sheet member 901 based on the obtained recording image data.

It is noted that the image forming portion 40 may perform an image formation process by a method other than the electrophotography, such as an ink jet method.

The communication portion 60 transmits and receives data to/from external apparatuses such as the management server 7 and the terminal apparatus 8, via the communication line 101. Furthermore, the communication portion 60 transmits and receives data to/from other portions, such as the main control portion 1, the scan control portion 30, and the print control portion 50, via the bus 9.

The image processing portion 70 executes various types of data processing on image data or the like obtained from other equipment via the bus 9. The target of the data processing of the image processing portion 70 is, for example, the document sheet image data obtained from the scan control portion 30, or the print job obtained from the terminal apparatus 8 via the communication portion 60.

As one example, the image processing portion 70 executes a process of converting print data included in the print job to the recording image data, and transporting the recording image data to the print control portion 50.

The scan control portion 30, the print control portion 50, and the image processing portion 70 are each composed of a DSP (Digital Signal Processor) or an ASIC (Application Specific Integrated Circuit).

The operation/display portion 2 includes an operation portion for inputting information, and a display portion. The operation portion includes, for example, a touch panel and operation buttons. The display portion includes, for example, a liquid crystal display panel and a notification lamp.

The main control portion 1 comprehensively controls the image forming apparatus 10. For example, the main control portion 1 displays an operation menu on the operation/display portion 2. Furthermore, the main control portion 1 outputs control commands to other control portions depending on detection results of various sensors and input information that was input via an operation on the operation/display portion 2. Furthermore, the main control portion 1 of the present embodiment executes an abnormality detection process to detect an apparatus abnormality of its associated apparatus.

As shown in FIG. 2, the main control portion 1 includes a MPU (Micro Processor Unit) 11, a RAM (Random Access Memory) 12, and a secondary storage portion 13.

The MPU 11 is a processor configured to execute various calculations and data processing. The RAM 12 is a volatile main storage portion for temporarily storing programs that are executed by the MPU 11.

The secondary storage portion 13 is a nonvolatile storage portion for storing various types of information that are referred to by the MPU 11. In addition, the secondary storage portion 13 is a storage portion from/to which various types of information can be read and written by the MPU 11. The secondary storage portion 13 stores programs for causing the MPU 11 to execute various types of processing, information referred to by the MPU 11, and information written by the MPU 11.

[Management Server 7]

Figure 3:
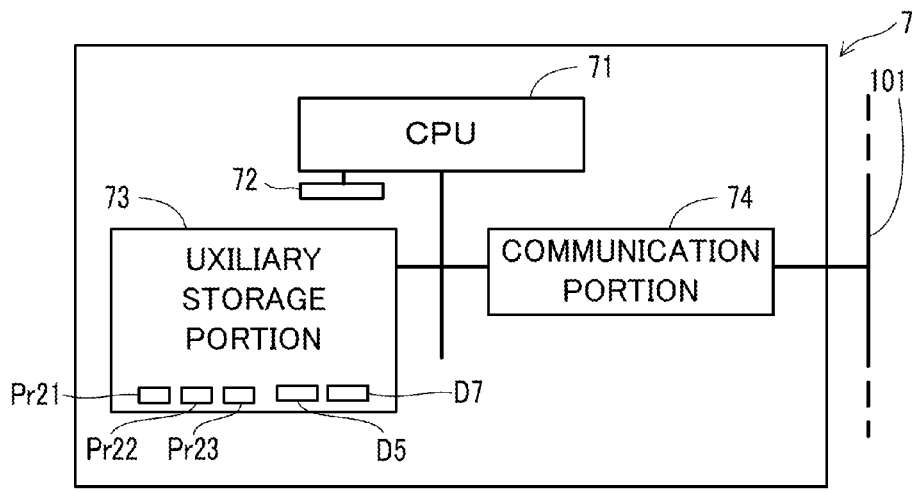
FIG. 3 is a block diagram of a management apparatus in the abnormality management system.

As shown in FIG. 3, the management server 7 includes a CPU (Central Processing Unit) 71, a main storage portion 72, an auxiliary storage portion 73, and a communication portion 74.

The CPU 71 is a processor configured to execute various calculations and data processing. The main storage portion 72 is a volatile main storage portion for temporarily storing programs that are executed by the CPU 71.

The auxiliary storage portion 73 is a nonvolatile storage portion for storing various types of information that are referred to by the CPU 71. In addition, the auxiliary storage portion 73 is a storage portion from/to which various types of data can be read and written by the CPU 71.

The auxiliary storage portion 73 also stores programs for causing the CPU 71 to execute various types of processing. It is noted that, for example, the auxiliary storage portion 73 may be a hard disk drive.

The communication portion 74 is a communication interface that performs transmission and reception of data to/from the image forming apparatus 10 via the communication line 101. The CPU 71 performs transmission and reception of data to/from the image forming apparatus 10 via the communication portion 74. During the process in which the management server 7 transmits or receives data to/from the image forming apparatus 10 via the communication line 101, the communication portion 74 relays the data communication between the CPU 71 and the image forming apparatus 10.

Meanwhile, it is troublesome to presuppose restoration procedures that correspond to various apparatus abnormalities that may occur in the image forming apparatus 10, and register information of all the restoration procedures in the management apparatus. In addition, a situation that requires any of the restoration procedures registered in advance may not actually happen. In that case, the work of registering the information of the restoration procedures in advance is wasted.

The abnormality management system 100 of the image forming apparatus 10 executes an abnormality management process so that information of restoration procedures from apparatus abnormalities in the image forming apparatus 10 can be registered and used efficiently. The following describes the process in detail.

[Abnormality Management Process]

In the following, an example of the procedure of the abnormality management process in the abnormality management system 100 is described with reference to the flowchart shown in FIG. 4. In the following description, S101, S102, . . . are identification signs representing the steps executed by the main control portion 1 of the image forming apparatus 10 during the abnormality management process. In addition, S201, S202, . . . are identification signs representing the steps executed by the CPU 71 of the management server 7 during the abnormality management process.

<Step S101>

In the image forming apparatus 10, the main control portion 1 executes the abnormality management process at all times. The abnormality management process is a process of detecting an apparatus abnormality of its associated apparatus. The apparatus abnormality is, for example, abnormality of data stored in a storage device such as the RAM 12 or the secondary storage portion 13, or abnormality of the control state.

When the MPU 11 executes an abnormality detection program Pr11, the main control portion 1 executes the process of step 5101. The main control portion 1 that executes the process of step S101 is an example of the abnormality detecting portion.

The abnormality of the control state is, for example, a fixing temperature abnormality in the image forming portion 40. The fixing temperature abnormality is a phenomenon in which the temperature of the fixing portion that heats the sheet member 901 after image formation, does not reach the target temperature in a predetermined time period after the activation.

The main control portion 1 executes the abnormality detection process at a certain timing, such as at every predetermined cycle, or each time the apparatus is activated. The apparatus abnormality that may be detected in step 5101 may include one or both of an abnormality of data stored in a storage device and an abnormality of the control state. In the following description, the apparatus abnormality detected in the step S101 is referred to as a detected abnormality.

<Step S102>

When an apparatus abnormality is detected, the main control portion 1 refers to restoration-procedure record data D1 stored in the secondary storage portion 13, and when a piece of restoration procedure data D02 corresponding to the detected abnormality is stored, obtains the piece of restoration procedure data D02.

The restoration procedure data D02 shows procedures of restoration process by which apparatus abnormalities were solved in the past. The restoration-procedure record data D1 is recorded in the secondary storage portion 13 by the main control portion 1, and includes the restoration procedure data D02.

Figures 6, 7, 8:
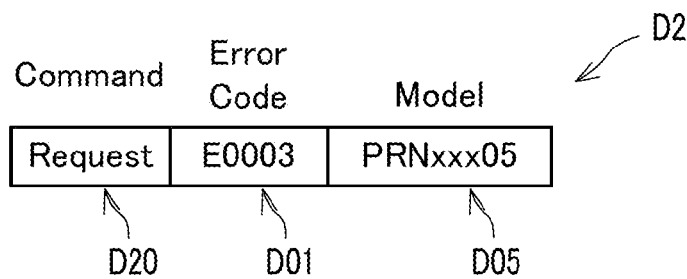
FIG. 6 is a configuration diagram of restoration-procedure record data in the image forming apparatus.
FIG. 7 is a configuration diagram of restoration procedure transmission request data that is transmitted by the image forming apparatus.
FIG. 8 is a configuration diagram of restoration procedure provision data that is transmitted by the management apparatus.

FIG. 6 shows an example of the restoration-procedure record data D1. In the example shown in FIG. 6, the restoration-procedure record data D1 includes error code D01, restoration procedure data D02, date D03, and times D04 that are associated with each other.

The error code D01 is information identifying contents of apparatus abnormalities that may be detected in the abnormality detection process. All apparatus abnormalities that can be detected by the main control portion 1 in the abnormality detection process of step S101 are associated with the error code D01 in advance.

The restoration procedure data D02 shows procedures of restoration process for solving the apparatus abnormalities. The restoration procedure data D02 included in the restoration-procedure record data D1 shows procedures of restoration process that were executed in the past when apparatus abnormalities had been detected, and thereby solved the apparatus abnormalities.

For example, when the apparatus abnormality is an abnormality of data stored in the secondary storage portion 13, the restoration process may include a process of intializing a part of the storage area of the secondary storage portion 13, and transporting the backup data to the initialized area. Furthermore, the restoration process may include a process of correcting data in the RAM 12 that is related to the data of the initialized area.

In addition, when the apparatus abnormality is a fixing temperature abnormality in the image forming portion 40, the restoration process may include a process of readjusting the control parameter of the fixing heater based on a difference between the target temperature and the detected temperature of the fixing temperature.

The date D03 is information indicating dates on which apparatus abnormalities of corresponding error codes in the error code D01 were detected and solved most recently.

The times D04 is information indicating the number of times for which apparatus abnormalities of corresponding error codes in the error code D01 were detected and solved.

When a piece of restoration procedure data D02 corresponding to the detected abnormality is stored in the secondary storage portion 13, the main control portion 1 executes the processes of steps S103 and S104. On the other hand, when a piece of restoration procedure data D02 corresponding to the detected abnormality is not stored in the secondary storage portion 13, the main control portion 1 executes the process of step S105.

The restoration-procedure record data D1 is recorded in the secondary storage portion 13 by the main control portion 1 in a process described below. As a result, in the initial state of the image forming apparatus 10, no restoration-procedure record data D1 is recorded in the secondary storage portion 13.

It is noted that as the MPU 11 executes a recorded information obtaining program Pr12, the main control portion 1 executes the process of step S102. The main control portion 1 executing the process of step S102 is an example of the recorded information obtaining portion.

<Step S103>

When a piece of restoration procedure data D02 corresponding to the detected abnormality is stored in the secondary storage portion 13, the main control portion 1 executes the restoration process in accordance with the piece of restoration procedure data D02.

<Step S104>

Subsequently, the main control portion 1 determines whether or not the detected abnormality was solved by the restoration process executed in step S103.

In addition, in the determination process of step S104, the main control portion 1 also determines whether or not the processing can be continued without resetting its associated apparatus. Upon determining that the processing can be continued without resetting its associated apparatus, the main control portion 1 continues the processing without resetting its associated apparatus.

On the other hand, upon determining that the processing cannot be continued without resetting its associated apparatus, the main control portion 1 continues the processing after resetting its associated apparatus.

It is noted that as the MPU 11 executes a recorded-restoration program Pr13, the main control portion 1 executes the processes of steps S103 and S104. The main control portion 1 executing the processes of steps S103 and S104 is an example of the recorded-restoration processing portion.

After the detected abnormality is solved, the main control portion 1 executes the process of step S110 that is described below. On the other hand, when a piece of restoration procedure data D02 corresponding to the detected abnormality is not stored in the secondary storage portion 13, or when the detected abnormality is not solved by the restoration process of step S103, the main control portion 1 executes the process of step S105.

<Step S105>

In step S105, the main control portion 1 requests the management server 7 to send a piece of restoration procedure data D02 that shows a restoration procedure for the detected abnormality, and obtains the data returned therefrom.

For example, in step S105, the main control portion 1 sends restoration procedure transmission request data D2 to the management server 7. In the example shown in FIG. 7, the restoration procedure transmission request data D2 includes a transmission request command D20, an error code D01, and a model D05.

The transmission request command D20 is a command requesting the management server 7 to send a piece of restoration procedure data D02 registered therein. The model D05 is identification information of the model of its associated apparatus, namely, the model of the image forming apparatus 10 that has detected the apparatus abnormality. It is noted that the model D05 may include version information of the firmware installed in the image forming apparatus 10.

The error code D01 and the model D05 included in the restoration procedure transmission request data D2 are data for identifying requested pieces of restoration procedure data D02.

When a requested piece of restoration procedure data D02 has been registered in the management server 7, restoration procedure provision data D3 is returned to the image forming apparatus 10 from the management server 7. As shown in FIG. 8, the restoration procedure provision data D3 includes the restoration procedure data D02.

In addition, as shown in FIG. 8, when the restoration procedure provision data D3 includes a plurality of pieces of restoration procedure data D02, the restoration procedure provision data D3 also includes a priority data D30 that shows the priority of each of the plurality of pieces of restoration procedure data D02.

It is noted that as the MPU 11 executes a registered information obtaining program Pr14, the main control portion 1 executes the process of step S105. The main control portion 1 executing the process of step S105 is an example of the registered information obtaining portion.

<Step S106>

When a piece of restoration procedure data D02 is obtained from the management server 7, the main control portion 1 executes the restoration process in accordance with the obtained piece of restoration procedure data D02.

<Step S107>

The main control portion 1 further determines whether or not the detected abnormality was solved by the restoration process executed in step S106. The process of step S107 is the same as the process of step S104. Upon determining that the detected abnormality was solved, the main control portion 1 executes the process of step S109 that is described below.

It is noted that as the MPU 11 executes a registered-restoration program Pr15, the main control portion 1 executes the processes of steps S106 and S107. The main control portion 1 executing the processes of steps S106 and S107 is an example of the registered-restoration processing portion. In the present embodiment, the processes of steps S106 and S107 are executed when the restoration procedure data D02 of the restoration-procedure record data D1 could not be obtained from the secondary storage portion 13, or when the detected abnormality was not solved by the restoration process of step S103.

<Step S108>

When a piece of restoration procedure data D02 corresponding to the detected abnormality could not be obtained from the management server 7, or when the detected abnormality was not solved by the restoration process of step S106, the main control portion 1 executes a specification reception/restoration process. The specification reception/restoration process is described in detail below (see FIG. 5).

<Step S109>

When the detected abnormality was solved by the restoration process executed in step S106, the main control portion 1 executes a restoration procedure registration request process. In this process, it is requested that the management server 7 register the piece of restoration procedure data D02 that indicates a solved apparatus abnormality and a restoration procedure that was adopted to solve the apparatus abnormality.

For example, in step S109, the main control portion 1 transmits, to the management server 7, restoration procedure registration request data D4 having the configuration shown in FIG. 9. In the example shown in FIG. 9, the restoration procedure registration request data D4 includes a registration request command D40, an error code D01, a model D05, and a restoration procedure data D02.

The registration request command D40 is a command to request the management server 7 to register the restoration procedure data D02. The error code D01 of the restoration procedure registration request data D4 identifies the apparatus abnormality solved by the process of step S106.

The model D05 of the restoration procedure registration request data D4 is identification information of the model of its associated apparatus. The restoration procedure data D02 of the restoration procedure registration request data D4 shows the procedure of the restoration process executed in step S106.

It is noted that as the MPU 11 executes a registration request program Pr16, the main control portion 1 executes the process of step S109. The main control portion 1 executing the process of step S109 is an example of the registration requesting portion.

<Step S110>

When the detected abnormality was solved by the restoration process of step S103 or step S106, the main control portion 1 executes a process of recording the restoration-procedure record data D1 in the secondary storage portion 13, or a process of updating the restoration-procedure record data D1.

More specifically, when the detected abnormality was solved by the restoration process of step S106, the main control portion 1 adds the error code D01, the restoration procedure data D02, the date D03, and the times D04 to the restoration-procedure record data D1.

The error code D01 to be added is data that identifies the apparatus abnormality solved by the restoration process of step S106. The restoration procedure data D02 to be added is data that indicates the restoration process of step S106. The date D03 to be added is the date on which the apparatus abnormality was detected, or the date on which the apparatus abnormality was solved. In addition, the initial value of the times D04 is 1 (one).

On the other hand, when the detected abnormality was solved by the restoration process of step S103, the main control portion 1 updates a corresponding part of the date D03 and the times D04 of the restoration-procedure record data D1 that has already been existing. In this update, the main control portion 1 updates date D03 and times D04 that correspond to a combination of error code D01 of the solved apparatus abnormality and restoration procedure data D02 indicating the restoration process of step S103.

It is noted that as the MPU 11 executes a registration procedure recording program Pr17, the main control portion 1 executes the process of step S110. The main control portion 1 executing the process of step S110 is an example of the registration procedure recording portion.

With the completion of the process of step S108 or step S110, the processing of the image forming apparatus 10 in the abnormality management process ends.

<Step S201>

On the other hand, the CPU 71 of the management server 7 monitors, at all times, whether or not a request for restoration procedure data D02 was sent from the image forming apparatus 10. That is, the CPU 71 monitors whether the restoration procedure transmission request data D2 was received.

<Step S202>

Upon receiving the restoration procedure transmission request data D2, the CPU 71 searches the data registered in the auxiliary storage portion 73 for the requested piece of restoration procedure data D02. The search target data is restoration procedure registration data D5.

The restoration procedure registration data D5 is a collection of the restoration procedure data D02 received from a plurality of image forming apparatuses 10 and is stored in the auxiliary storage portion 73. As described below, upon receiving the restoration procedure registration request data D4 from the image forming apparatus 10, the CPU 71 collects the content of the restoration procedure registration request data D4, and stores it in the auxiliary storage portion 73 as the restoration procedure registration data D5.

For example, in the example shown in FIG. 10, the restoration procedure registration data D5 includes an error code D01, a model D05, a restoration procedure data D02, a date D07, and times D08 that are associated with each other.

The error code D01, the model D05, and the restoration procedure data D02 included in the restoration procedure registration data D5 are data that had been included in the restoration procedure registration request data D4 from the image forming apparatus 10. In addition, the date D07 indicates the date on which the restoration procedure registration request data D4 that includes the error code D01, the restoration procedure data D02, and the model D05 that correspond to the date D07, was received most recently.

The times D08 indicates the number of times that the restoration procedure registration request data D4 including the error code D01, the restoration procedure data D02, and the model D05 that correspond to the times D08, was received.

In step S202, the CPU 71 searches the restoration procedure registration data D5 for a piece of restoration procedure data D02 that corresponds to a combination of the error code D01 and the model D05 included in the received restoration procedure transmission request data D2.

In addition, in step S202, the CPU 71 may search for data that corresponds to, in addition to the model D05 included in the restoration procedure transmission request data D2, another model D05 of the same series. In that case, information regarding the series of the model D05 may be stored in advance in the auxiliary storage portion 73, and the CPU 71 may refer to the information.

<Step S203>

Furthermore, the CPU 71 of the management server 7 transmits the detection result to the image forming apparatus 10 that had requested the restoration procedure data D02. That is, when the restoration procedure data D02 is included in the restoration procedure registration data D5, the CPU 71 transmits the restoration procedure provision data D3 that includes the restoration procedure data D02, to the image forming apparatus 10 (see FIG. 8).

When a plurality of pieces of restoration procedure transmission request data D2 are obtained by the searching of step S202, the CPU 71 adds priority data D30 that shows the priority of each of the plurality of pieces of restoration procedure transmission request data D2, to the restoration procedure provision data D3 and transmits the restoration procedure provision data D3.

For example, restoration procedure data D02 corresponding to model D05 included in restoration procedure transmission request data D2 may be assigned a higher priority than restoration procedure data D02 corresponding to another model D05 of the same series.

Furthermore, in a plurality of pieces of restoration procedure data D02 corresponding to the same model D05, a piece of restoration procedure data D02 having a larger number of times D08 may be assigned a higher priority than a piece of restoration procedure data D02 having a smaller number of times D08. Furthermore, in a plurality of pieces of restoration procedure data D02 corresponding to the same model D05, a piece of restoration procedure data D02 corresponding to a later date D07 may be assigned a higher priority than a piece of restoration procedure data D02 corresponding to an earlier date D07.

On the other hand, when the requested restoration procedure data D02 is not included in the restoration procedure registration data D5, the CPU 71 transmits a notification that the requested data is not registered, to the image forming apparatus 10. After the process of step S203, the CPU 71 repeats the processes from step S201.

As described above, in steps S201 to S203, the CPU 71 executes a registered information returning process. The registered information returning process is a process in which, when the management server 7 receives a request for registered restoration procedure data D02 from the image forming apparatus 10, the requested restoration procedure data D02 is returned to the image forming apparatus 10. The CPU 71 executes the processes of steps S201 to S203 by executing a registered information returning program Pr21. The CPU 71 executing the processes of steps S201 to S203 is an example of the registered information returning portion.

[Specification Reception/Restoration Process]

Figure 4:
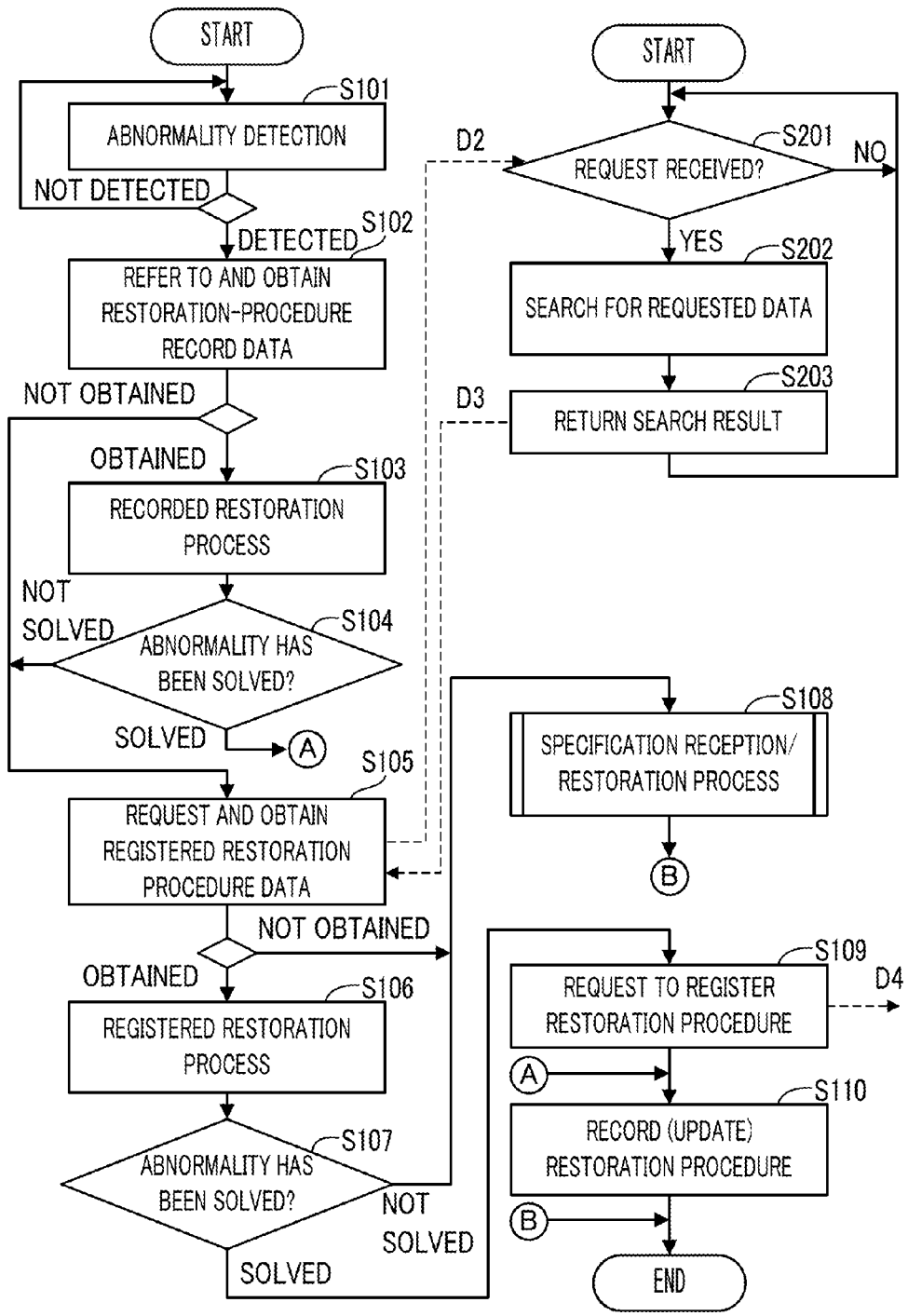
FIG. 4 is a flowchart showing an example of a procedure of an abnormality management process in the abnormality management system of the image forming apparatus.

Next, an example of the procedure of the specification reception/restoration process executed in step S108 of FIG. 4 is described with reference to the flowchart shown in FIG. 5. In the following description, S301, S302, . . . are identification signs representing the steps executed by the main control portion 1 of the image forming apparatus 10 during the specification reception/restoration process. In addition, S401, S402, S501, S502 are identification signs representing the steps executed by the CPU 71 of the management server 7 during the abnormality management process.

<Step S301>

In the specification reception/restoration process, the main control portion 1 of the image forming apparatus 10 transmits a piece of detected abnormality notification data D6 including information of the detected apparatus abnormality to the management server 7.

For example, as shown in FIG. 11, the detected abnormality notification data D6 includes a notification command D60, an error code D01, a model D05, and an apparatus ID D06. The notification command D60 indicates that the detected abnormality notification data D6 is data for notifying the content of the apparatus abnormality detected in the image forming apparatus 10.

The error code D01 of the detected abnormality notification data D6 is information that identifies the content of the detected abnormality that was not solved by the restoration processes of step S103 and step S106.

The model D05 and the apparatus ID D06 of the detected abnormality notification data D6 are model information of its associated apparatus and identification information of its associated apparatus, respectively. For example, the apparatus ID D06 may be a production number of its associated apparatus or a MAC address.

The processes of steps S301 and S302 are executed when registered restoration procedure data D02 could not be obtained from the management server 7 in step S105, or when the detected abnormality was not solved by the restoration process of step S106.

The process of step S301 is a process of notifying information of the detected abnormality to a predetermined communication destination. The main control portion 1 executing the process of step S301 is an example of the abnormality information notifying portion.

<Step S302>

Furthermore, in the image forming apparatus 10, the main control portion 1 executes a specification receiving process of receiving a specification input that specifies a restoration procedure for the detected abnormality. The specification receiving process is executed in accordance with operation of a personnel, such as a service engineer, who is well informed about the image forming apparatus 10.

The main control portion 1 receives the specification input via the operation/display portion 2. The main control portion 1 executing the process of step S302 is an example of the specification receiving portion.

It is noted that a maintenance terminal may be connected to the main control portion 1 via a connector (not illustrated), and the main control portion 1 may receive the specification input via the maintenance terminal.

<Step S303>

Furthermore, the main control portion 1 executes the restoration process in accordance with the specification input. The main control portion 1 repeats the processes of steps S302 and S303 after a predetermined specification reception start operation is performed until a specification reception end operation is performed on the operation/display portion 2.

<Step S304>

When the specification reception end operation is performed, the main control portion 1 determines whether or not the detected abnormality was solved by the restoration process executed in step S303. The process of step S304 is the same as the process of step S104 of FIG. 4.

It is noted that the main control portion 1 executing the processes of steps S303 and S304 is an example of the specified-restoration processing portion that executes a specified restoration process.

<Step S305>

When the detected abnormality was solved by the restoration process executed in step S303, the main control portion 1 executes the restoration procedure registration request process, as in step S109 of FIG. 4. As described above, in the restoration procedure registration request process, it is requested that the management server 7 register a piece of restoration procedure data D02 that indicates a solved apparatus abnormality and a restoration procedure that was adopted to solve the apparatus abnormality. The main control portion 1 executing the process of step S305 is an example of the registration requesting portion.

For example, in step S305, as in step S109 of FIG. 4, the main control portion 1 transmits, to the management server 7, a piece of restoration procedure registration request data D4 having the configuration shown in FIG. 9.

<Step S306>

When the detected abnormality was solved by the restoration process of step S303, the main control portion 1 records the restoration-procedure record data D1 in the secondary storage portion 13. More specifically, the main control portion 1 adds, to the restoration-procedure record data D1, an error code D01 identifying the solved detected abnormality, a restoration procedure data D02 indicating the restoration process of step S303, a date D03, and times D04.

When the detected abnormality is not solved by the restoration process of step S303, or when the processes of steps S305 and S306 end, the processing of the image forming apparatus 10 in the specification reception/restoration process ends.

<Step S401>

On the other hand, the CPU 71 of the management server 7 monitors, at all times, whether or not information of the detected abnormality was notified from the image forming apparatus 10. That is, the CPU 71 monitors whether the detected abnormality notification data D6 was received.

<Step S402>

Upon receiving the detected abnormality notification data D6, the CPU 71 stores, as abnormality status data D7, the error code D01, the model D05, and the apparatus ID D06 included in the detected abnormality notification data D6, in the auxiliary storage portion 73.

The abnormality status data D7 stored in the auxiliary storage portion 73 is data that is referred to and used by a personnel, such as a service engineer, who specifies a restoration procedure for the detected abnormality in step S302. With the configuration where the detected abnormality notification data D6 includes the apparatus ID D06, it is possible to identify an image forming apparatus 10 in which an apparatus abnormality has occurred.

In the management server 7, after the process of step S402 ends, the processes from step S401 are repeated. The CPU 71 executes the processes of steps S401 to S402 by executing an abnormality information recording program Pr22.

<Step S501>

Furthermore, the CPU 71 of the management server 7 monitors, at all times, whether or not a registration request for the restoration procedure data D02 was received from the image forming apparatus 10. That is, the CPU 71 monitors whether the restoration procedure registration request data D4 was received. The restoration procedure registration request data D4 is data that is transmitted in step S109 of FIG. 4 and step S305 of FIG. 5.

<Step S502>

Upon receiving the restoration procedure registration request data D4, the CPU 71 stores, as a restoration procedure registration data D5, the error code D01, the model D05, and the restoration procedure data D02 included in the restoration procedure registration request data D4, in the auxiliary storage portion 73.

The restoration procedure registration request data D4 is an example of the registration request, and the error code D01, the model D05, and the restoration procedure data D02 included in the restoration procedure registration request data D4 are an example of the information of an apparatus abnormality and a restoration procedure for solving the apparatus abnormality.

The process of step 5502 is an example of the process of storing registered restoration procedure information in the auxiliary storage portion 73, the registered restoration procedure information including the information of an apparatus abnormality and a restoration procedure for solving the apparatus abnormality included in the registration request from the image forming apparatus 10. This process is executed when the registration request was received from the image forming apparatus 10. The CPU 71 executing the process of step 5502 is an example of the restoration procedure registering portion.

The CPU 71 executes the processes of steps S501 to S502 by executing a restoration procedure registering program Pr23.

In the present embodiment, the CPU 71 stores, in the auxiliary storage portion 73, the date D07 and the times D08 in addition to the error code D01, the model D05 and the restoration procedure data D02, as a part of the restoration procedure registration data D5.

In the management server 7, after the process of step S502, the processes from step S501 are repeated.

Figure 5:
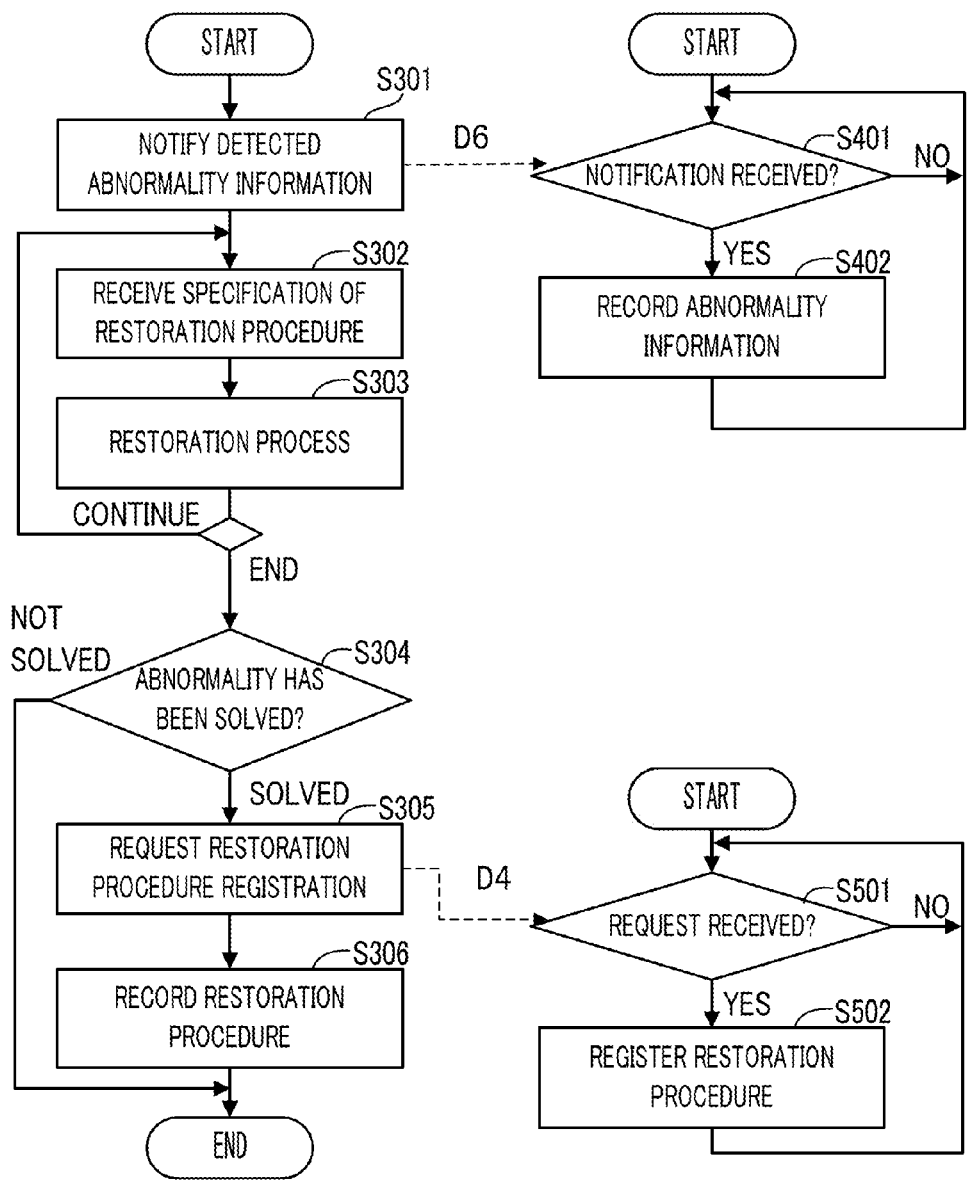
FIG. 5 is a flowchart showing an example of a procedure of a specification reception/restoration process in the abnormality management process.

According to the present embodiment, when the apparatus abnormality occurs in the image forming apparatus 10, the restoration process is executed in accordance with a restoration procedure specified by a specialist such as a service engineer (S302, S303 of FIG. 5). Furthermore, when the apparatus abnormality is solved by the restoration process executed in accordance with the restoration procedure, the restoration procedure is automatically registered in the management server 7 as the restoration procedure registration data D5 (S502 of FIG. 5).

The restoration procedure registration data D5 registered in the management server 7 is used by a plurality of image forming apparatuses 10 when the same apparatus abnormality is detected therein (S105 of FIG. 4). This eliminates troublesome works of registering data of all restoration procedures that can be presupposed, in the management server 7 in advance, and preparing, in advance, a plurality of restoration programs that correspond to respective restoration procedures.

In addition, the image forming apparatus 10 records, in the secondary storage portion 13, the restoration-procedure record data D1 indicating a restoration procedure that was effective in solving an apparatus abnormality in the apparatus itself (S110 of FIG. 4). When the same apparatus abnormality occurs again, the image forming apparatus 10 executes the restoration procedure indicated by the restoration-procedure record data D1 recorded in the secondary storage portion 13 of the apparatus itself, more preferentially than the restoration procedures registered as the restoration procedure registration data D5 in the management server 7 (S103 of FIG. 4).

As a result, when the same apparatus abnormality occurs again, a restoration procedure that is highly possible to be effective in the apparatus itself is executed preferentially. This enables the apparatus abnormality to be solved quickly.

In addition, when having failed to obtain, from the management server 7, restoration procedure data D02 that corresponds to a detected abnormality, or when having failed to solve a detected abnormality by executing the restoration process of step S106, S107, the image forming apparatus 10 notifies a predetermined external apparatus of information of the detected abnormality (S301 of FIG. 5).

The above-mentioned notification is made in a state where a detected abnormality could not be solved by the restoration process of step S103, S106 that is automatically executed in the image forming apparatus 10, and handling by a personnel such as a service engineer has become necessary.

When, in the above-mentioned state, the detected abnormality notification data D6 indicating the content of the detected abnormality is transmitted to an external apparatus in which a personnel can refer to the data, the personnel can grasp the state of the image forming apparatus 10 in advance. It is noted that in the present embodiment, the external apparatus is the management server 7.

Many of abnormalities of storage data and control state in the storage device can be solved automatically when the MPU 11 executes the programs. As a result, the abnormalities of storage data and control state are suitable as a target of the abnormality management process.

[Application Examples]

In the above-described embodiment, the restoration-procedure record data D1 may be recorded in a storage portion of another apparatus with which the image forming apparatus 10 can communicate via the first LAN 102.

Similarly, the restoration procedure registration data D5 may be recorded in a storage portion of another apparatus with which the management server 7 can communicate via the second LAN 103.

In addition, the detected abnormality notification data D6 may be transmitted to a communication destination of an external apparatus that is different from the management server 7. Furthermore, the detected abnormality notification data D6 may be transmitted to the external apparatus, as data of electronic mail. In this case, the communication destination is an electronic mail address of the external apparatus.

When an apparatus abnormality of its associated apparatus is detected in step S101 of FIG. 4, the main control portion 1 may determines whether or not the apparatus abnormality is an abnormality of a type that allows the main control portion 1 to continue the processing without resetting its associated apparatus. Upon determining that the apparatus abnormality is an abnormality of a type that allows the main control portion 1 to continue the processing without resetting its associated apparatus, the main control portion 1 may execute the processes of step S102 and onward, and upon determining that the apparatus abnormality is not an abnormality of that type, the main control portion 1 may reset its associated apparatus.

It is noted that the image forming apparatus and the abnormality management system of the image forming apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An abnormality management system of an image forming apparatus comprising:
a management apparatus; and
the image forming apparatus communicable with the management apparatus, wherein
the image forming apparatus includes:
an abnormality detecting portion configured to detect an apparatus abnormality;
a registered information obtaining portion configured to request the management apparatus to send registered restoration procedure information, and obtain the registered restoration procedure information returned from the management apparatus, the registered restoration procedure information indicating a restoration procedure for solving the apparatus abnormality detected by the abnormality detecting portion;
a registered-restoration processing portion configured to execute a registered restoration process in accordance with the registered restoration procedure information obtained from the management apparatus;
a specification receiving portion configured to receive a specification input that specifies a restoration procedure for the detected apparatus abnormality, when the registered restoration procedure information was not obtained from the management apparatus, or when the apparatus abnormality was not solved by the registered restoration process;
a specified-restoration processing portion configured to execute a specified restoration process in accordance with the specification input; and
a registration requesting portion configured to, when the apparatus abnormality was solved by the specified restoration process, request the management apparatus to register information of the solved apparatus abnormality and of the specified restoration procedure, and
the management apparatus includes:
a restoration procedure registering portion configured to, upon receiving, from the image forming apparatus, a registration request including the information of the solved apparatus abnormality and of the restoration procedure for solving the apparatus abnormality, store, in a storage portion, the registered restoration procedure information that includes the information, included in the registration request, of the apparatus abnormality and of the restoration procedure for solving the apparatus abnormality, and information indicating the number of times for which registration requests were received and dates on which the registration requests were received; and
a registered information returning portion configured to, upon receiving, from the image forming apparatus, a request for the registered restoration procedure information, return the requested registered restoration procedure information to the image forming apparatus, wherein
when returning a plurality of pieces of registered restoration procedure information, the registered information returning portion sets a priority to each of the plurality of pieces of registered restoration procedure information by setting a higher priority to a piece of registered restoration procedure information that has a larger number of times for which registration requests were received, and by setting a higher priority to a piece of registered restoration procedure information that has newer dates on which the registration requests were received, and returns the plurality of pieces of registered restoration procedure information, as well as information of priorities set to the plurality of pieces of registered restoration procedure information.

2. The abnormality management system of the image forming apparatus according to claim 1, wherein
the image forming apparatus further includes:
a restoration procedure recording portion configured to, when the apparatus abnormality was solved by the registered restoration process or the specified restoration process, record information of the solved apparatus abnormality and of the specified restoration procedure in the storage portion;

a recorded information obtaining portion configured to obtain recorded information of a restoration procedure corresponding to the detected apparatus abnormality, by referring to the storage portion; and a recorded-restoration processing portion configured to execute a recorded restoration process in accordance with the recorded information obtained from the storage portion, wherein the registered-restoration processing portion executes the registered restoration process when the recorded information was not obtained from the storage portion, or when the apparatus abnormality was not solved by the recorded restoration process.

3. The abnormality management system of the image forming apparatus according to claim 1, wherein the image forming apparatus further includes:

an abnormality information notifying portion configured to notify information of the detected apparatus abnormality to a predetermined communication destination, when the registered restoration procedure information was not obtained from the management apparatus, or when the apparatus abnormality was not solved by the registered restoration process.

4. The abnormality management system of the image forming apparatus according to claim 1, wherein the apparatus abnormality that is a target of detection and/or restoration includes one or both of an abnormality of data stored in a storage device included in the image forming apparatus, and an abnormality of a control state.

* * * * *